United States Patent
Hight, Jr. et al.

(10) Patent No.: US 7,093,838 B2
(45) Date of Patent: *Aug. 22, 2006

(54) GASKETS AND GASKET-LIKE DEVICES INCLUDING FASTENERS FOR GASKETS AND A METHOD OF MAKING AND USING THE SAME

(76) Inventors: Henry C. Hight, Jr., 14789 Old Bandera Rd., Helotes, TX (US) 78023; Sylvia Hight, 14789 Old Bandera Rd., Helotes, TX (US) 78023

( * ) Notice: Subject to any disclaimer, the term of this patent is extended or adjusted under 35 U.S.C. 154(b) by 0 days.

This patent is subject to a terminal disclaimer.

(21) Appl. No.: 11/069,434

(22) Filed: Mar. 1, 2005

(65) Prior Publication Data

US 2005/0132540 A1    Jun. 23, 2005

Related U.S. Application Data

(63) Continuation of application No. 10/736,398, filed on Dec. 15, 2003, now Pat. No. 6,893,025.

(60) Provisional application No. 60/434,895, filed on Dec. 19, 2002.

(51) Int. Cl.
*F16J 15/02* (2006.01)
*A44B 11/25* (2006.01)
*A44B 9/02* (2006.01)

(52) U.S. Cl. ............... 277/630; 277/637; 277/640; 24/293; 24/296

(58) Field of Classification Search ............... 277/616, 277/630, 637, 640; 24/293–297; 52/718.07; 267/28–29, 166–180
See application file for complete search history.

(56) References Cited

U.S. PATENT DOCUMENTS

| 1,173,949 | A | * | 2/1916 | Gilliland ............... 152/89 |
| 1,816,591 | A | * | 7/1931 | Kirby ............... 411/262 |
| 2,024,805 | A | * | 12/1935 | Place ............... 411/548 |
| 2,197,590 | A | * | 4/1940 | Place ............... 24/296 |
| 3,160,251 | A | * | 12/1964 | La Penna et al. ...... 52/718.07 |
| 3,668,731 | A | * | 6/1972 | McBride ............... 15/146 |
| 4,403,561 | A | * | 9/1983 | Schaeflern et al. ...... 112/237 |
| 4,822,060 | A | * | 4/1989 | Moyer et al. ............... 277/640 |
| 4,986,033 | A | * | 1/1991 | Weil ............... 49/492.1 |
| 5,004,216 | A | * | 4/1991 | Boudreau ............... 267/179 |
| 5,107,623 | A | * | 4/1992 | Weil ............... 277/637 |
| 5,205,075 | A | * | 4/1993 | Moyer ............... 49/493.1 |
| 5,694,666 | A | * | 12/1997 | Hamamoto ............... 24/297 |

FOREIGN PATENT DOCUMENTS

FR    2819303 A1 *   7/2002

* cited by examiner

*Primary Examiner*—Vishal Patel
(74) *Attorney, Agent, or Firm*—Jackson Walker, LLP

(57) ABSTRACT

A gasket for sealing between a wall and a gasket support surface, such as between an oven housing and an oven door. The gasket includes a clip, the clip typically being made from a single strand of wire. The wire is bent into a head and a base, the base for engaging the gasket and head dimensioned for engagement with a wall for a support surface.

10 Claims, 3 Drawing Sheets

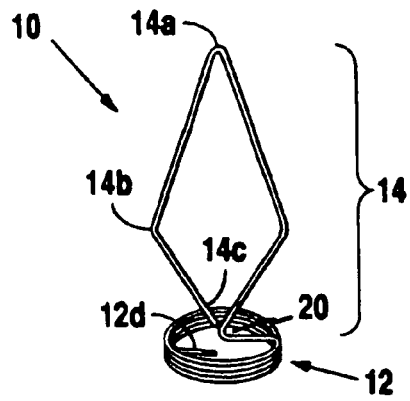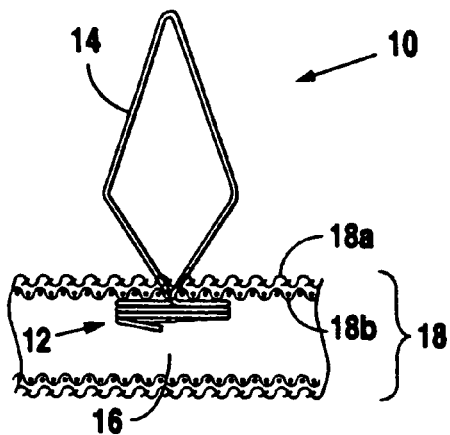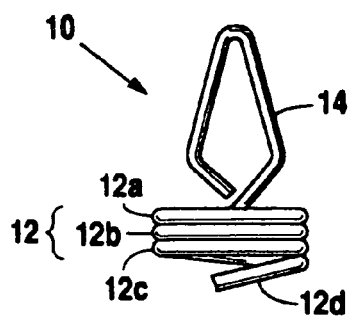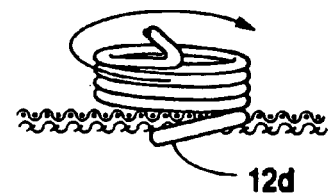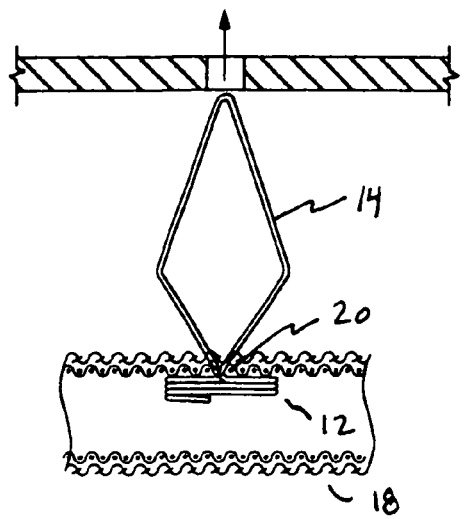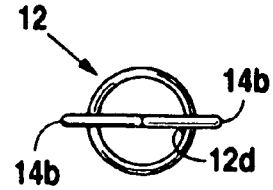
Fig. 1
Fig. 2
Fig. 3
Fig. 4
Fig. 5
Fig. 6

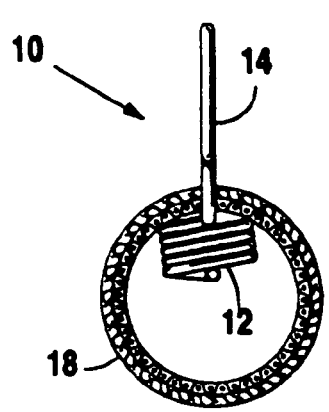
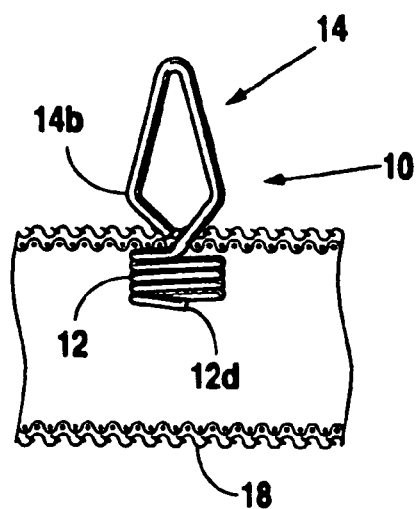
Fig. 7　　　　　Fig. 8
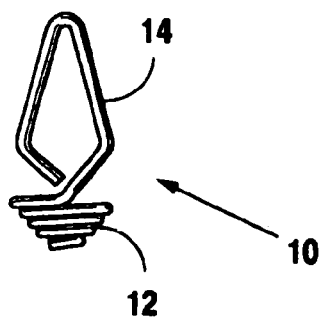
Fig. 9A　　　　　Fig. 9B
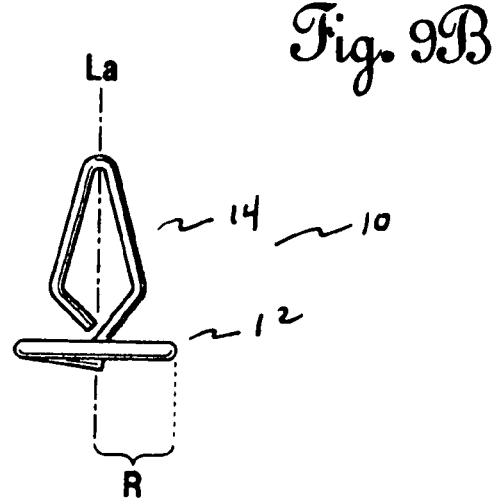
Fig. 9C

GASKETS AND GASKET-LIKE DEVICES INCLUDING FASTENERS FOR GASKETS AND A METHOD OF MAKING AND USING THE SAME

This application is a continuation of, claims priority from, and incorporates by reference U.S. patent application, Ser. No. 10/736,398, filed Dec. 15, 2003 now U.S. Pat. No. 6,893,025, which claimed priority from provisional patent application Ser. No. 60/434,895 filed Dec. 19, 2002.

FIELD OF THE INVENTION

Gasket, gasket-like devices and clips for attaching gaskets to a mounting surface gaskets and a method for using the same and for making a gasket with an insertable clip.

BACKGROUND OF THE INVENTION

The tubular articles of this invention are typically comprised of a thermally insulating yarn which may be supported by an inner tubular wire core. In a particular application, the articles are gaskets used, for example, as over door seals.

Woven tubular articles have been used for seals for oven doors for many years. These articles are typically made from a combination of an inner tubular support member formed of knitted wire and an outer tubular member made either by braiding, knitting or weaving an insulating material such as fiberglass yarn. Such structures have proven to be durable at the high temperatures used in self cleaning ovens and provide a good seal despite repeated openings and closures of the oven door over many years of use.

Methods of attaching a tubular gasket to an oven or oven door surface have typically comprised providing a retaining member which extends along the gasket and locking the retaining member between sheet metal pieces of the oven or by providing clamps at spaced locations around the periphery of the gasket.

An alternative form of gasket has attachment means comprised of a wire form having space attachment protrusions which fit into corresponding holes in surface to which the gasket is to be attached is shown in the prior art.

The present invention relates to an improvement in the fastening of gaskets to mounting surfaces and also to a novel resilient fastener which is simple to install onto a tubular gasket, easy to manufacture and effective in retaining the gasket to a support surface.

The present invention provides for an improved clip having a head with an apex, a pair of shoulders and a neck and a base attached to the head. The base may comprise of at least one coil course having a variable or constant radius of curvature.

Applicants novel improvement further provides a one piece resilient wire strand a portion defining a head and a second portion defining a base, the head and base perpendicular to one another and the head capable of protruding from the gasket while the base is engaged with an interior thereof.

Applicants novel invention further comprises a sealing apparatus comprising a gasket and a clip engaged with the gasket, the clip having a head and a coiled base, the coiled base being perpendicular to the plane of the head and adapted to be engaged with the metal core of the gasket, as being enclosed in an interior thereof.

The doors of many appliances, such as ovens, refrigerators, microwaves, etc., have flexible tubular gaskets around their perimeter for sealing and a variety of other reasons. See for example U.S. Pat. Nos. 4,986,033 and 4,822,060, the specifications and drawings of which are incorporated herein by reference and attached hereto.

BRIEF DESCRIPTION OF THE DRAWING

FIG. 1 is a perspective view of applicants novel clip, the clip for engagement with a gasket to attach a gasket to a support surface.

FIG. 2 is an illustration of applicants novel clip gasket combination for sealing a gasket to a support surface, in side elevational view.

FIG. 3 illustrates an embodiment of applicants clip 10 with a base having three courses, 12a, 12b and 12c, each course having the same radius of curvature.

FIGS. 4 and 5 illustrate the steps involved with placement of a multiplicity of clip 10 into a gasket having a sheath 18a and a wire core 18b.

FIG. 6 illustrates a top view of applicants clip 10 illustrating shoulders 14b, base 12 and tail 12d.

FIGS. 7 and 8 illustrate end and side views of the gasket having a clip installed.

FIGS. 9a, 9b and 9c illustrate an alternate embodiment of embodiment of applicants clip 10 having coils with different radii of curvature. Note that this embodiment may include coils "stacked" as in FIG. 9a, or wound in the same plane as illustrated in the side view, FIG. 9C.

DETAILED DESCRIPTION OF THE PREFERRED EMBODIMENTS

Figure 10:
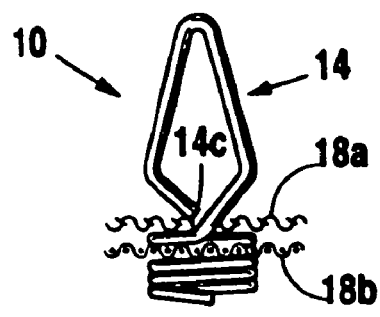
FIG. 10 illustrate one of the coils between sheath 18a and mesh 18b and at least one inside mesh 18b.

A number of fasteners are provided in the prior art; however, applicants provide a fastener, here clip fastener 10, which includes a helically wound or coiled portion designated base 12 for engagement with an oven seal or gasket 18 to seal the oven seal or gasket 18 to the wall of an oven or oven door or the like.

Turning now to FIG. 1, it is seen that applicant provides a clip fastener 10 such as may be fashioned from a single strand or multiple strands of bendable, pliable, resilient metal wire or other suitable material. Here, it is seen that applicants clip fastener 10 includes an oven wall engagement portion or head 14 which is attached at neck 20 to the coiled or wound base 12.

Turning now to oven wall engagement portion or head 14, it is seen to have a narrow or pointed apex 14a for insertion into a hole in an oven or oven door, for example, or other support base in ways known in the art. From apex 14a, the head expands to shoulders 14b of which there are typically a pair, which are typically diametrically opposed. One of the shoulders typically tapers to a wire end 14c and the other shoulder typically tapers inward to a point adjacent end 14c, then the coils defining coiled base 12.

FIG. 3 illustrates a coiled based 12 having three adjacent, typically contacting courses 12a, 12b and 12c, the last course ending in a tail 12d which typically angles downward, and is spaced apart from the lower course. The tail may be pointed or sharp to better engage the woven sheath 18a and/or wire core 18b of oven seal or gasket 18 (see FIG. 2).

Oven seal or gasket 18 is typical of oven gaskets set forth in the prior art and typically consists of a wire mesh core 18b which is usually cylindrical and resilient and made of a woven wire material, and which is covered with a woven fiberglass sheath material made up of many individual fiberglass strands woven together, here referenced as sheath 18a.

With applicants novel clip fastener 10 having, typically, one or a multiplicity of courses and a tail, a unique means is provided for fastening the clip fastener to a gasket to provide an oven seal. This method is illustrated in the attached drawings and consists of inserting tail 12d into either the woven sheath (typically between individual strands) or the wire core and rotating the clip fastener on an longitudinal axis Lc extending through the apex and the neck and rotating so as to wind the base into and through the woven sheath and/or the wire core such that the strands of the wire core and/or woven sheath are adjacent the neck portion and captured between the head and the base where the clip fastener 10 is narrow. The effect is to secure the clip to the gasket by, typically, locating the base against an inner surface of the wire core and/or sheath and the head protruding above the woven sheath.

Since the base has a plane substantially perpendicular to the longitudinal axis of the head, it will interfere with the removal of the tension loaded clip from the gasket and, when the head is inserted into an oven door, will secure the gasket adjacent an oven door.

The longitudinal axis of the head will typically run perpendicular straight through an axis defining the coil Lc so as to define the axis upon which the clip is wound when inserting the clip with the gasket. The clip fastener 10 may be made from stainless steel (ex. type 304 ss half hard)or spring steel or any other suitable material diameter typically 0.020" to 0.030", typically 0.025".

The clips may be twisted into the wire core first and then a fiberglass sheath may be woven around the clip. Alternately, the oven seal or gasket material may be provided with a woven sheath already woven around the wire core and the novel clip fastener with a depending tail 12d may be placed adjacent the wove sheath and inserted between strands of the woven sheath until it "catches" and then further urged beneath the woven sheath and rotated until it "catches" a strand or the wire core. Continued rotation will allow the base to slip through the woven sheath and the wire core until it is fully seated beneath the wire core.

FIGS. 4, 5, 6, 7, 8, 10 and 11 may be useful in understanding the method of inserting applicants novel clip 10 into gasket 18. FIG. 4 illustrates a manner in which tail 12d may be inserted between woven strands of the sheath and the core as by spreading the strands slightly and inserting the tail, with subsequent twisting. FIG. 5 shows the manner in which the base of the clip may be seated fully within an interior space defined by wire mesh core 18B. It may be appreciated with reference to FIG. 5 that the apex is dimensioned to slide through a hole in the support surface, the shoulders dimensioned to be substantially wider than the hole. Moreover, when the head is made of resilient steel, insertion through the hole will allow the shoulders to resiliently collapse as they pass through the hole of the support surface and expand as the head of the clip continues through the hole of the sport surface, past the shoulders and toward the neck. The resiliency of the spring steel of the head as it lays adjacent the neck as well as the perpendicular alignment between the plane of the head and the coils of the base, as the base lays within the interior of the gasket, assist and holding the gasket snugly against the support surface.

FIGS. 7 and 8 illustrate additional views of a clip fully inserted into the gasket. Here again, especially with FIG. 8 it can be appreciated how the geometry of the clip, especially between the shoulders and the neck 20 helps hold the clip in place. In a preferred embodiment, as illustrated in FIG. 8 the base is fully inserted into the interior space of the gasket and the head 14 lays substantially above the outer surface of sheath 18a.

FIG. 9A illustrates a multicoil base wherein adjacent coils of different radius of curvature, FIG. 9B providing a bottom view of the base of FIG. 9A.

FIG. 9C is provided to illustrate longitudinal axis La of the head and the radius of curvature of the base. In a preferred embodiment the base is comprised of a single coil having a constant radii of curvature and laying in a plane perpendicular to the plane of the head. In an alternate preferred embodiment, the base is made of a multiplicity of courses having a constant radius of curvature R, which courses lay adjacent to one another such that they are in contact with one another. In a preferred embodiment, the head 14 and the base 12 are formed from a single strand of resilient 0.250" diameter stainless steel wire, with one end of the wire adjacent the neck, and the other end of the wire defining a tail.

Figure 11:
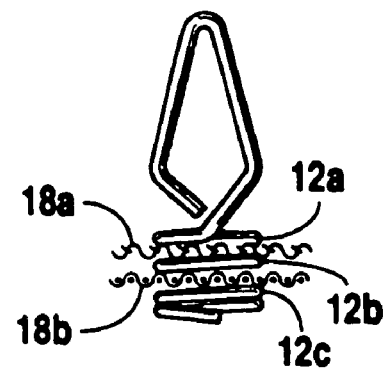
FIG. 11 illustrates 3 courses, 12a and 12b "sandwiching" sheath 18a and 12b and 12c "sandwiching" mesh 18b.

FIGS. 10 and 11 illustrate two different clip situations. First, FIGS. 10 and 11 may be used to illustrate the position of the clip with respect to the two layers of the gasket as the clip is being inserted into a position but will ultimately set the base fully within the interior of the gasket as is seen in FIGS. 7 and 8. Alternately, FIGS. 10 and 11 may illustrate an alternate preferred configuration between the sheet and the clip. For example, FIG. 10 may be used where one desires to have at least one course or coil of a multicoiled base between the sheath and the wire mesh of the gasket. FIG. 11 illustrates a position of the clip with respect to the gasket wherein the sheath of the gasket is trapped between a pair of adjacent coils of the base and wherein the wire mesh is trapped between another adjacent pair of coils of the base.

Figure 12:
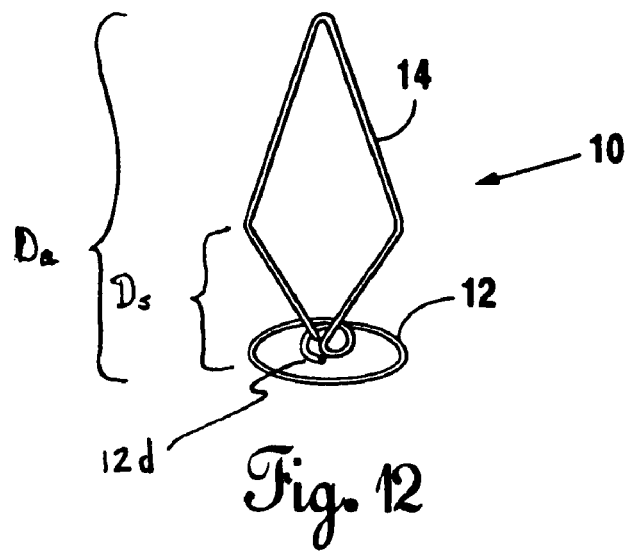
FIG. 12 illustrates an embodiment having a single course with a Ld going through the radius of the coil.

FIG. 12 is alternate preferred embodiment of applicants present invention wherein the tail 12d is twisted back so that it comes up adjacent to the longitudinal access of the head and just below the neck. FIG. 12 is also used to illustrate a preferred dimension of the head. Distance Ds between the base and the shoulders, typically about 0.130". Distance Da between the base and the apex is about 0.410". Width at the shoulders is typically about 0.190". These dimensions are sufficient for the head to penetrate a hole about 0.156" wide and hold the gasket to a panel about 0.050" thick.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

The invention claimed is:

1. A gasket assembly, comprising:
   a gasket having a woven sheath comprised of a multiplicity of strands and a wire mesh core, the wire mesh core defining a gasket interior volume; and
   a clip for engaging the gasket, the clip comprising a head having an apex, a pair of shoulders and a neck, the clip having a longitudinal axis;

a base attached to the head, the base comprising at least one coil course, the coil course having a plane and an interior space defined by a base perimeter, the longitudinal axis of the head extending perpendicular from the interior space of the coil course in a first direction to the plane of the coil course, the first direction above the plane of the coil course;

wherein the base further includes a tail, the tail depending from the plane of the base in a second direction, the second direction generally below the plane of the coil course, the clip comprising a single resilient wire having a first end and a second end, the second end of the resilient wire comprising the tail.

2. The gasket assembly of claim 1 wherein the tail is dimensioned to be insertable into both the woven sheath and mesh core without damage to the gasket.

3. The gasket assembly of claim 1 wherein the base comprises at least two courses.

4. The gasket assembly of claim 3 wherein the courses have the same radii of curvature.

5. The gasket assembly of claim 3 wherein the courses have different radii of curvature.

6. The gasket assembly of claim 1 wherein the first end of the single resilient wire comprises at least a portion of the head of the clip.

7. The gasket assembly of claim 1 wherein the apex, shoulders and neck of the head lay in a single plane.

8. The gasket assembly of claim 1 wherein the base is dimensioned to fit within the gasket interior volume.

9. The gasket assembly of claim 8 wherein the clip is adapted to be removed from the gasket interior volume.

10. The gasket assembly of claim 8 wherein the courses have declining radii of curvature.

* * * * *